United States Patent
Nemitallah et al.

(10) Patent No.: US 9,664,115 B2
(45) Date of Patent: May 30, 2017

(54) ZERO-EMISSION, CLOSED-LOOP HYBRID SOLAR-SYNGAS OTR POWER CYCLE

(71) Applicant: King Fahd University of Petroleum and Minerals, Dhahran (SA)

(72) Inventors: Medhat Ahmed Nemitallah, Dhahran (SA); Mohamed Abdel-Aziz Habib, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 509 days.

(21) Appl. No.: 14/212,271

(22) Filed: Mar. 14, 2014

(65) Prior Publication Data

US 2015/0260105 A1 Sep. 17, 2015

(51) Int. Cl.
*F02C 7/22* (2006.01)
*F02C 6/00* (2006.01)
(Continued)

(52) U.S. Cl.
CPC .............. *F02C 7/22* (2013.01); *B01J 12/007* (2013.01); *C01B 3/34* (2013.01); *C01B 13/0251* (2013.01); *F02C 1/05* (2013.01); *F02C 3/22* (2013.01); *F02C 6/00* (2013.01); *F03G 6/00* (2013.01); *B01J 2208/00451* (2013.01); *B01J 2219/00144* (2013.01); *C01B 2203/0216* (2013.01);
(Continued)

(58) Field of Classification Search
CPC ...... F02C 3/22; F02C 6/00; F02C 7/22; F02C 1/05; C01B 3/02; C01B 3/061; C01B 3/34; C01B 3/503; C01B 3/505; C01B 13/207; C01B 2203/0211; C01B 2203/0222; C01B 2203/0227; C01B 2203/0233; C01B 2203/0238
See application file for complete search history.

(56) References Cited

U.S. PATENT DOCUMENTS

| 6,233,914 B1 | 5/2001 | Fisher |
| 6,832,485 B2 | 12/2004 | Sugarmen et al. |

(Continued)

OTHER PUBLICATIONS

"Splitting CO2 into CO and O2 by a single catalyst"; Chen et al; Proceedings of the National Academy of Sciences, vol. 109 No. 39, Sep. 25, 2012; http://www.pnas.org/content/109/39/15606.full.*

(Continued)

*Primary Examiner* — Arun Goyal
(74) *Attorney, Agent, or Firm* — Oblon, McClelland, Maier & Neustadt, L.L.P.

(57) ABSTRACT

A zero-emission, closed-loop and hybrid solar-produced syngas power cycle is introduced utilizing an oxygen transport reactor (OTR). The fuel is syngas produced within the cycle. The separated oxygen inside the OTR through the ion transport membrane (ITM) is used in the syngas-oxygen combustion process in the permeate side of the OTR. The combustion products in the permeate side of the OTR are $CO_2$ and $H_2O$. The combustion gases are used in a turbine for power production and energy utilization then a condenser is used to separate $H_2O$ from $CO_2$. $CO_2$ is compressed to the feed side of the OTR. $H_2O$ is evaporated after separation from $CO_2$ and fed to the feed side of the OTR.

13 Claims, 1 Drawing Sheet

(51) Int. Cl.
*F02C 3/22* (2006.01)
*F03G 6/00* (2006.01)
*F02C 1/05* (2006.01)
*B01J 12/00* (2006.01)
*C01B 3/34* (2006.01)
*C01B 13/02* (2006.01)

(52) U.S. Cl.
CPC ............... *C01B 2203/0222* (2013.01); *C01B 2203/0855* (2013.01); *C01B 2203/0894* (2013.01); *C01B 2203/1241* (2013.01); *C01B 2203/84* (2013.01); *F05D 2220/32* (2013.01); *Y02E 10/46* (2013.01); *Y02P 20/134* (2015.11)

(56) References Cited

U.S. PATENT DOCUMENTS

| | | | |
|---|---|---|---|
| 7,393,384 B2* | 7/2008 | Gopalan | B01D 53/228 423/648.1 |
| 7,882,692 B2 | 2/2011 | Pronske et al. | |
| 8,117,822 B2 | 2/2012 | Habib et al. | |
| 8,999,283 B1* | 4/2015 | Kuhn | C01B 31/18 423/263 |
| 9,249,690 B2* | 2/2016 | Karni | F02C 3/20 |
| 2004/0112741 A1* | 6/2004 | Murdoch | B01D 53/26 204/265 |
| 2007/0044662 A1* | 3/2007 | Song | B01D 53/228 96/4 |
| 2008/0256952 A1 | 10/2008 | Litwin et al. | |
| 2011/0207006 A1* | 8/2011 | Lee | B01J 19/123 429/420 |
| 2013/0004801 A1* | 1/2013 | Henry | H01M 8/0606 429/9 |
| 2013/0045517 A1* | 2/2013 | Oakley | B01D 53/526 435/139 |
| 2013/0071318 A1* | 3/2013 | Higashiyama | B01J 23/002 423/648.1 |
| 2015/0222002 A1* | 8/2015 | Graves | C25B 1/00 320/128 |

OTHER PUBLICATIONS

"Porous material converts CO2 into carbon monoxide and oxygen"; Aug. 21, 2015; http://phys.org/news/2015-08-porous-material-co2-carbon-monoxide.html.*

Device Uses Solar Energy to Convert Carbon Dioxide Into Fuel:; Science Daily; Apr. 18, 2007; https://www.sciencedaily.com/releases/2007/04/070418091932.htm.*

* cited by examiner

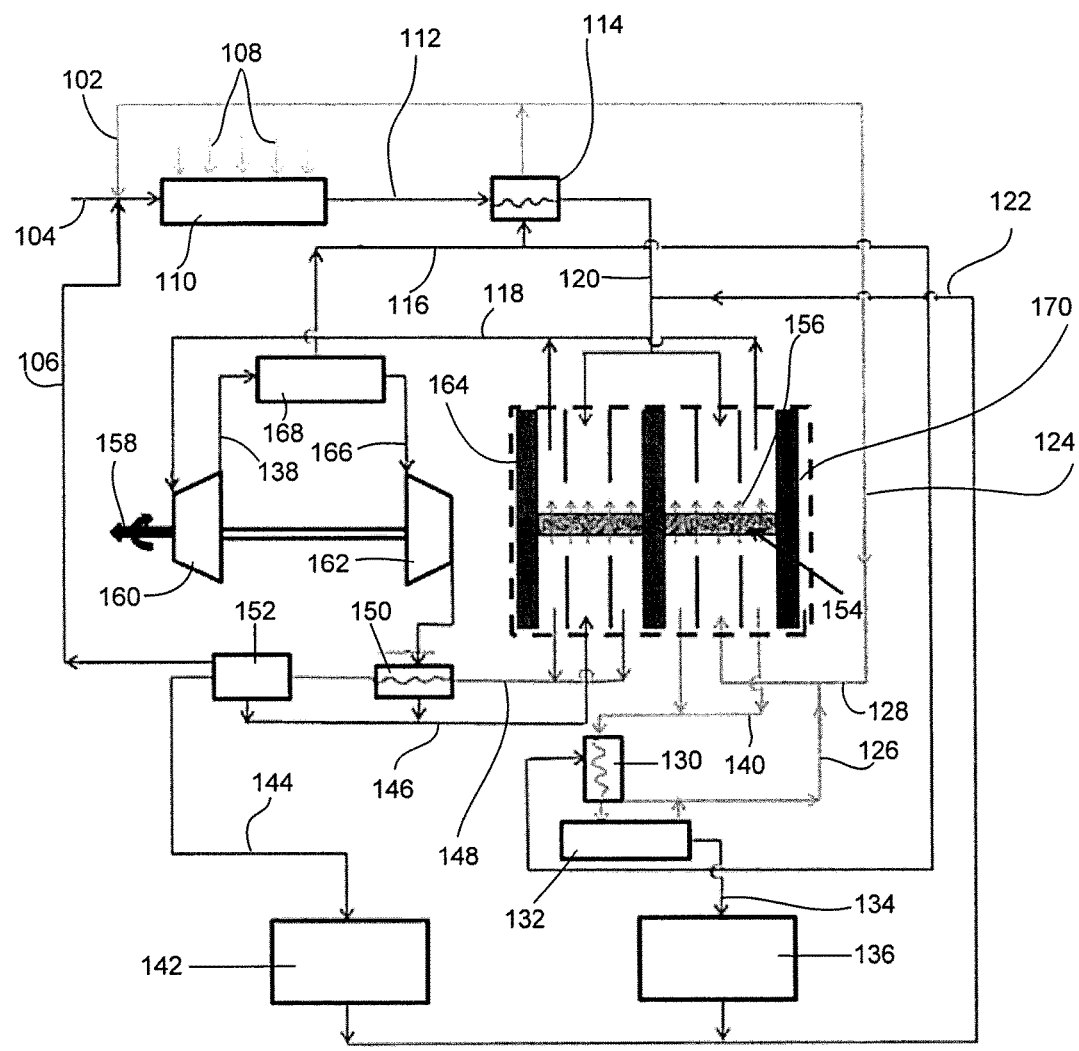

ZERO-EMISSION, CLOSED-LOOP HYBRID SOLAR-SYNGAS OTR POWER CYCLE

BACKGROUND OF THE INVENTION

Technical Field

The present invention relates to a hybrid solar-syngas power cycle system comprising a solar reformer, a water evaporator, a plurality of oxygen transport membrane reactors, a plurality of condensers and a gas turbine in which the system is a zero emission fuel cycle and a method for producing syngas using the system in which the combustion products are used as feed gases in order to separate oxygen for combustion and produce syngas in the feed side of the oxygen transport membrane reactor.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the present century, Global warming is the greatest world challenge. Carbon dioxide ($CO_2$) is the main greenhouse gas contributor to global warming (]Nemitallah M. A., Ben-Mansour R., Habib M. A., Numerical investigations of methane fueled oxy-fuel combustion model in a gas turbine combustor: 1. Flow fields, temperature, and species distribution; 2. Effect of $CO_2$ recirculation., Proceedings of the $10^{th}$ WSEAS conference on heat transfer and environment, Istanbul 2012, ISSN: 2227-4596 and ISBN: 978-1-61804-114-2—incorporated herein by reference in its entirety). Atmospheric $CO_2$ concentration is continuously increasing and causing the average global temperature to rise (IPCC., Contribution of working groups I, II and III to the fourth assessment report of the intergovernmental panel on climate change, Intergovernmental Panel on Climate Change 2007—incorporated herein by reference in its entirety). The largest source of $CO_2$ emissions in the coming decades is the fossil fuel-based power plants (Ghoniem A. F., Needs, resources and climate change: clean and efficient conversion technologies, Progress in Energy Combustion Science 2011, 37:15-51.—incorporated herein by reference in its entirety). This increased rate of $CO_2$ emissions and the global temperature rise forced the development of technologies designed to reduce $CO_2$ emissions resulting from large power plants. Such technologies include carbon capture and storage (CCS), nuclear power and renewable energies such as wind, biomass, and solar in addition to improving the efficiencies of energy conversion (Habib M. A, Nemitallah M. A, Ben-Mansour R., Recent development in oxycombustion technology and its applications to gas turbine combustors and ITM reactors, Energy Fuels 2013, 27, 2-19—incorporated herein by reference in its entirety). The most promising technology which can give a quick response to the global warming due to $CO_2$ emissions (mainly from large power plants) with the lowest available cost is the carbon capture and sequestration technology. There are different available carbon capture technologies which can be applied in the utility industry (Pacala S., Socolow R., Stabilization wedges: solving the climate problem for the next 50 years with current technologies, Science 2004, 305:968-72—incorporated herein by reference in its entirety). Those technologies for carbon capture are post-combustion carbon capture technology, oxy-combustion carbon capture technology and pre-combustion carbon capture technology. Oxy-combustion process is the most promising carbon capture technology. The aim of an oxy-combustion process is to improve the combustion process, reduce the amount of $NO_x$ emissions and capture the resultant $CO_2$ at the exit section. Using syngas as a fuel results in a reduction in the $CO_2$ concentration at the exhaust section due to the reduction in the number of carbon atoms in fuel and improved combustion due to the presence of hydrogen. Another solution to reduce the carbon dioxide life cycle is through the use of biomass-derived syngas. This results in increasing the amount of $NO_x$ in the exhaust gases. There are three ways where $NO_x$ can be formed from the combination of oxygen and nitrogen (Baukal C., Schwartz R., The John Zink combustion handbook, LLC: John Zink Co., 2001; Law C. K., Combustion physics, Cambridge University Press, 2006; Turns S. R., An introduction to combustion concepts and applications, the $2^{nd}$ edditin, McGraw Hill, 2006; Lieuwen T. C., Yang V., Yetter R., Synthesis gas combustion: fundamentals and applications, Taylor & Francis Group, 2010—each incorporated herein by reference in its entirety). Those three ways include the fuel NOx, thermal NOx and prompt NOx.

In order to reduce the emissions, the oxygen enriched syngas air combustion technique serves as an intermediate solution. The oxygen enriched combustion with air or pure oxygen combustion enhance the fuel combustion process due to the associated reduction of $N_2$ with the oxidizing air. Nitrogen has serious effects on the combustion process as it is an energy carrier medium and it mixes with the combustion gases so that it reduces the concentration of the oxidizing oxygen Cacua K., Amell A., Olmos L., Estudio comparativo entre las propiedades de combustion de la mezcla biogas-aire normaly biogas-aire enriquecido con oxigeno, Ingenieriae et Investigacion 2011, 31, 233-41—incorporated herein by reference in its entirety). In addition, because nitrogen has a high capacity to absorb heat, it absorbs energy and as a result, the combustion efficiency is reduced. In the present disclosure, a combination between both oxy-fuel combustion technology inside ITM reactors and syngas production technology is described. An oxygen transport membrane reactor is used to separate the required oxygen for the syngas-oxygen combustion process in the permeate side of the membrane. In addition, $H_2$ and CO as syngas are separated from $H_2O$ and $CO_2$, respectively, in the feed side of the membrane. Integration has been made in this form of a solar transformer for the methane during the day time to the cycle. It is expected by 2020 that the membrane usage in gas separation to be increased by a factor of five (Bernardo P, Drioli E, Golemme G. Membrane gas separation: a review of state of the art. Industrial Chemical Engineering 2009; 48(1):4638-63—incorporated herein by reference in its entirety). Research has been disclosed in order to improve the performance and chemical stability for wide operating range and different operating conditions. ITM reactor technology may be applied for carbon capture by direct combustion of permeated oxygen in the permeate side of the membrane with fuel (Rahimpour M R, Mirvakili A, Paymooni K. A novel water perm-selective membrane dual-type reactor concept for FischereTropsch synthesis of GTL (gas to liquid) technology. ENERGY 2011, 36, 1223-1235—incorporated herein by reference in its entirety). Also, this technology can be used for the production of hydrogen from natural gas (Sjardin M, Damen K J, Faaij A P. Techno-economic prospects of small-scale membrane reactors in a future hydrogen-fuelled transportation sector. ENERGY 2006, 31, 2523-2555—incorporated herein by reference in its entirety). The membrane reactor is a technology for the production of hydrogen from natural gas. It promises economic small-scale hydrogen production, e.g. at refueling stations and has the potential of inexpensive $CO_2$ separation.

The combustion and flame characteristics are also affected while burning syngas with enhanced oxygen air combustion. The syngas combustion with enhanced oxygen improves the flammability limits and the burning velocity. This is because the fuel itself contains hydrogen molecules and also the reaction rates of the fuel in the oxygen-enriched mediums are improved (Burbano H. J., Pareja J., Amell A. A., Laminar burning velocities and flame stability analysis of $H_2$/CO/air mixtures with dilution of $N_2$ and $CO_2$, International Journal of Hydrogen Energy 2011, 36, 3232-42.—incorporated herein by reference in its entirety). Serrano et al. (Serrano C., Herna'ndez J. J., Mandilas C., Sheppard C. G. W., Woolley R., Laminar burning behaviour of biomass gasification-derived producer gas, International Journal of Hydrogen Energy 2008, 33, 851-62—incorporated herein by reference in its entirety) defined the laminar flame speed (burning velocity) to be the propagation speed of the flame for a single dimensional, flat, un-stretched and continuous flame. Laminar flame speed is a very important parameter affecting the combustion characteristics and flame stabilization and behavior. Liu et al. (Liu C., Yan B., Chen G., Bai X. S., Structures and burning velocity of biomass derived gas flames, International Journal of Hydrogen Energy 2010, 35, 542-55—incorporated herein by reference in its entirety) showed that using the laminar flame speed, many premixed flame parameters can be calculated. Those parameters include flash back, extinction, blow off, in addition to the chemical data of gases and turbulent flame propagation. Cuong and Song (Cuong V. H., Song C. K., Combustion and NOx emissions of biomass-derived syngas under various gasification conditions utilizing oxygen-enriched-air and steam, Fuel 2013, 107, 455-464—incorporated herein by reference in its entirety) conducted an experimental study on the combustion of biomass-extracted syngas through a gasification process for different biomass feedstock. Air was used as the oxidizer mixture with different oxygen and steam enrichment concentrations. It was concluded that at higher operating oxygen enrichment levels, the $NO_x$ emissions increase may be justified by the increased level of the combustion temperature and high heating value of the biomass-derived syngas. Nemitallah and Habib (Nemitallah M. A., Habib M. A., Experimental and numerical investigations of an atmospheric diffusion oxy-combustion flame in a gas turbine model combustor, Applied Energy, 2013, 11, 401-415—incorporated herein by reference in its entirety) investigated experimentally and numerically a diffusion flame under oxy-fuel combustion and atmospheric pressure conditions inside a small combustor model of a gas turbine. They have studied the oxy-fuel emission and combustion characteristics, in addition to checking the flame stability using methane as a fuel and using oxygen and $CO_2$ as the oxidizer mixture. All of the tested oxy-combustion flames encountered instabilities when the oxygen percent in the oxidizer falls below 25%. For all of the tested flames, flame was blown out for all operating conditions when oxygen percent in the oxidizer is less than 21%.

There are a lot of associated problems with the fossil fuel combustion inside conventional gas turbine and boiler furnaces. The main problem of fossil fuel combustion is the emissions out of the burner, especially $CO_2$, which is the main contributor to the global warming, and $NO_x$, which is the main cause for acid rain. Oxy-combustion can provide a solution to such emission problems of $CO_2$ and $NO_x$. Using oxygen for the combustion process instead of air results in zero $NO_x$ emissions because of the lack of nitrogen from the oxidizer. In addition, the combustion products consist mainly of $CO_2$ and $H_2O$. $H_2O$ can be separated easily so that $CO_2$ can be captured. The present disclosure not only describes a method for capturing $CO_2$ but also describes full recirculation of exhaust gases inside a loop. The system utilizes an OTR for both oxygen separation and syngas production from the exhaust gases.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the disclosure includes a zero-emission, closed-loop and hybrid solar-produced syngas power cycle system.

In another embodiment the system includes a solar reformer configured to convert methane to syngas.

In another embodiment the system includes two or more oxygen transport membrane reactors.

In another embodiment an oxygen transport membrane reactor is configured to separate $H_2$ gas from water introduced from the feed side of the reactor to pass across the membrane to a permeate side.

In another embodiment an oxygen transport membrane reactor is configured to separate CO gas from $CO_2$ gas introduced from a feed side of the reactor to pass across a membrane to the permeate side.

In another embodiment oxygen separation, syngas production, and fuel combustion occur inside the oxygen transport membrane reactor.

In another embodiment the system includes an ion transport membrane located within the oxygen transport membrane reactor.

In another embodiment the system includes two or more condensers configured to separate water from $CO_2$.

In another embodiment the system includes a gas turbine configured to produce power from a combustion gas.

In another embodiment the system includes a water evaporator configured to produce $H_2O$ steam and $H_2$ gas.

In another embodiment the system includes a combustion gas storage unit.

In another embodiment the system includes a heat exchanger unit configured to pass feed gas to the oxygen transport membrane reactor.

In another embodiment the system does not produce carbon or $NO_x$ and the exhaust gases include only water vapor and $CO_2$.

In another embodiment a method for producing syngas in a zero-emission closed-loop hybrid solar-syngas power cycle is disclosed. In another embodiment the method includes contacting methane in a solar reformer to produce syngas.

In another embodiment the method includes separating $O_2$ used for the syngas-oxygen combustion process in the permeate side of the membrane.

In another embodiment the method includes separating $H_2$ and CO as syngas in the feed side of the oxygen transport reactor by passing it through an ion transport membrane.

In another embodiment the method includes powering production through the use of the combustion gases in a gas turbine.

In another embodiment the method includes separating $H_2O$ from $CO_2$ through one or more condensers. In another embodiment the method includes evaporating $H_2O$ to be used in the feed side of the oxygen transport reactor in an evaporator.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic of a zero-emission, closed-loop and hybrid solar-produced syngas power cycle.

DETAILED DESCRIPTION OF THE EMBODIMENTS

Referring now to the drawings, wherein like reference numerals designate identical or corresponding parts throughout the several views.

The present disclosure describes a design for a power cycle utilizing a gas turbine operated by the combustion gases from of an oxygen transport reactor (OTR). The OTR is used in the combustion process of syngas using the separated oxygen in the permeate side and in the splitting of $H_2O$ and $CO_2$ for $H_2$ and CO recovery, respectively. The combustion gases consist of $H_2O$ and $CO_2$ which are fed again to the feed side in order to split $H_2$ and CO, i.e. it is a closed-loop power cycle. Thus, a zero emission power cycle due to the complete exhaust gas recirculation from the permeate to the feed side of the membrane inside the OTR is disclosed. During the day time, the syngas production process is enhanced using a solar reformer which includes a method of reforming methane using $H_2O$ or $CO_2$.

A zero-emission, closed-loop and hybrid solar-produced syngas power cycle is described utilizing an oxygen transport reactor (OTR). The fuel used in this power cycle is syngas produced within the cycle. During the day time, syngas is produced from two sources within the cycle. One source is from methane reforming using water or carbon dioxide through a solar reformer. The other source is from the button cell oxygen transport reactor (OTR) by splitting $CO_2$ for CO production and splitting $H_2O$ for $H_2$ production. Both CO and $H_2$ produced from the OTR are stored during the day time. During the night time, there are also two sources for syngas, one from the button cell OTR and the other from the stored CO and $H_2$ during the day time operation. The separated oxygen inside the OTR through the ion transport membrane (ITM) is used in the syngas-oxygen combustion process in the permeate side of the OTR. The combustion products in the permeate side of the OTR are $CO_2$ and $H_2O$. The combustion gases are used in a turbine for power production and energy utilization then a simple condenser is used to separate $H_2O$ from $CO_2$. Then, $CO_2$ is compressed to the feed side of the OTR. $H_2O$ is also evaporated after its separation from $CO_2$ so that it can be fed to the feed side of the OTR. This cycle is classified as a zero emission cycle because the combustion products are used as the feed gases in order to both separate oxygen for combustion and produce syngas in the feed side of the OTR.

In one embodiment of the invention, the oxygen transport reactor includes an ion transport membrane. The ion transport membrane can preferably comprise mixed metal oxide materials and be used as a catalytic membrane for gas-phase oxygen separation processes. Oxygen-deficient oxides are derived from brownmillerite materials which have the general structure $A_2B_2O_5$. The metal elements at the B-site in the brownmillerite structure are selected to provide mixed ion- and electron-conducting materials and particularly to provide material that conduct oxygen anions and electrons. The materials of this invention have the general formula:

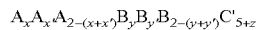

$$A_xA_{x'}A_{2-(x+x')}B_yB_{y'}B_{2-(y+y')}C'_{5+z}$$

where: x and x' are greater than 0; y and y' are greater than 0; x+x' is less than or equal to 2; y+y' is less than or equal to 2; z is a number that makes the metal oxide charge neutral; A is an element selected from the lanthanide elements and yttrium; A' is an element selected from the Group 2 elements; B is an element selected from the group consisting of Al, Ga, In or mixtures thereof; and B' and B" are different elements and are independently selected from the group of elements Mg or the d-block transition elements. The lanthanide metals include the f block lanthanide metals: La, Ce, Pr, Nd, Pm, Sm, Eu, Gd, Tb, Dy, Ho, Er, Tm, Yb, and Lu. Yttrium has properties similar to the f block lanthanide metals and is also included in the definition of lanthanide metals. A is preferably La or Gd, with La more preferred. Group 2 metal elements of the Periodic Table (also designated Group 11a) are Be, Mg, Ca, Sr, Ba, and Ra. The preferred Group 2 elements for the A' element of the materials of this disclosure are Ca, Sr and Ba and Sr is most preferred. The more preferred B elements are Ga and Al, with Ga more preferred. The d block transition elements include Sc, Ti, V, Cr, Mn, Fe, Co, Ni, Cu, and Zn. Preferred B' and B" elements are Mg, Fe and Co, with Fe and Co being more preferred as B' and B", respectively. Mixed metal oxides in which B" and B" are Fe and Co are particularly preferred for membranes having high oxygen flux rates. The value of z in the above formula depends upon the values of x, x', y and y' and the oxidation states of the A, A', A", B, B' and B" elements. The value of z is such that the mixed metal oxide material is charge neutral. In preferred materials, the value of z is between zero and one, 0<z<1. Preferred stoichiometries for materials of this invention of the above formula are those in which x is about 0.1 to about 0.6, and x' is about 1.4 to about 1.9, and where in addition x+x' is about equal to 2. More preferred are materials in which x is about 0.3 to about 0.5 and x' is about 1.5 to about 1.7. Also preferred are those materials of the above formula where y is about 0.3 to about 0.9 and y' is about 0.70 to about 1.70. More preferred materials have y=about 0.6 and y'=about 1.0 to about 1.4. More preferred materials have y+y' equal to about 1.6 to about 2.0.

Electronically- and ionically-conducting membranes employed in the oxygen-separation reactors comprise mixed metal oxides of the above formula. Substantially gas-impermeable membranes having both electronic and ionic conductivity are formed by initially preparing mixed metal oxide powders by repeatedly calcining and milling the powders of individual metal oxides or the corresponding carbonates (or other metal precursors) in the desired stoichiometric ratios. The resulting mixed metal oxide is then pressed and sintered into dense membranes of various shapes, including disks and open-one-ended tubes. These membranes are then employed to construct catalytic membrane reactors, particularly for oxygen separation processes. The purity of the product oxygen produced in reactors, which can be stored or used in other chemical processes, is generally greater than about 90% and preferably greater than about 99%. The presence of the mixed metal oxide of desired stoichiometry (as in the given formulas) in a repeatedly calcined and milled mixed metal oxide can be assessed by X-ray diffraction studies.

The oxidation surface, or the reduction surface or both surfaces (or parts of those surfaces) of the membrane can be coated with an oxidation catalyst or reduction catalyst, respectively, or both. A preferred catalyst for either or both surfaces of the membrane is $La_{0.8}Sr_{0.2}CoO_{3-z}$ where z is a number that makes the oxide charge neutral.

As shown in FIG. 1, the cycle includes two button cell oxygen transport reactors 164 and 170 and in each reactor there is an oxygen transport membrane 154 that separates the reaction zone from the feed zone. A first button cell oxygen transport reactor 170 is used for the separation of oxygen from a stream of $H_2O$ steam 128 ($H_2O$ steam is a result of $H_2O$ steam produced during the day 124 or $H_2O$ steam produced during the night 126) and producing a stream of $H_2$ and $H_2O$ gas 140 in the feed side. The other oxygen transport reactor 164 is used for the separation of oxygen from a $CO_2$ stream 146 and producing a stream of CO and $CO_2$ gas 148 also in the feed side. The syngas is collected after separation from the feed side while the combustion process occurring in the permeate side using a stream of syngas 120 (i.e. the syngas 122 produced from the feed side is used in the permeate side in the combustion process with the separated oxygen and the combustion gases in the permeate side are used in the feed side after generating power through a gas turbine (closed loop). During the day time and in order to improve the fuel rate for combustion, a solar reformer 110 is used for the reformation of methane 104 using a stream of $H_2O$ steam 102 and a stream of $CO_2$ 106 utilizing solar energy 108. The excess produced syngas 112 from both of the solar reformer 110 and OTR 164 and 170 is stored for the use at night CO is stored in a storage unit 142 during the day and H2 is stored in a storage unit 136 during the day. An evaporator 114 separates $H_2O$ steam from the syngas 112 to be used as an input gas into the solar reformer 110 for methane reformation.

Oxygen gas 156 is separated from the feed gases using ion transport membranes 154. The oxygen flux is proportional to the pressure ratio of the oxygen on the outside surface (feed side) to that on the inside surface (permeate side) of the membrane.

In the power cycle, the exhaust gases from the OTRs contain carbon dioxide and water vapor 118 (oxy-combustion) which can be easily separated without the need of any chemical processing, thus, saving the energy required to separate carbon dioxide from the exhaust gases containing nitrogen in case of air combustion.

During the day time, the produced syngas from both of the OTR reactors 164 and 170 is stored in a storage tank 136 and 142 for the use during night beside the continuously produced syngas from the OTR reacts even at night.

During the day time, a solar reformer 110 is used for the reformation of methane using $H_2O$ 102 or $CO_2$ 106 (part of combustion products) in order to produce syngas 112 utilizing the solar energy 108. The combustion gases leaving the OTR reactors are containing energy that can be used in power generation. These combustion gases are passed through a gas turbine 160 in order to generate power. This power can be increased by increasing the number of OTR reactors. After power generation, the exhaust gases containing $H_2O$ and $CO_2$ 138 are passed through a condenser 168 in order to separate $H_2O$ and produce a stream of $H_2O$ water 116 from a stream of $CO_2$ 166. $CO_2$ 166 is compressed through a compressor 162 (driven using part of the gas turbine power 158) to the feed side of the OTR reactor.

Between the $CO_2$ compressor 162 and the OTR 166, there is a heat exchanger 150 in order to heat the $CO_2$ to the required operating temperature utilizing the heat from the gases leaving the feed side of the reactor. A CO separator 152 is located adjacent to the heat exchanger 150 and separates CO 144 to be stored in the storage unit 142 and also releases $CO_2$ during the day time to be used as an input gas into the solar reformer 110 to produce syngas 112. The combustion products are used continuously as feed gases to the OTR reactors and part of them is used during the day time in the solar reformer 110. After separating $H_2O$ from the exhaust gases of the OTRs and during the day time, $H_2O$ is then evaporated in the evaporator 114 using the heat from the syngas 112 leaving the solar reformer 110 as the $H_2O$ gas stream 124 in order to be fed to the OTR 170 at the required operating temperature. During the night time, the separated $H_2O$ from the exhaust gases is evaporated in a heat exchanger 130 by recovering the heat from the leaving feed side gases 140 of the OTR and then it is passed through a condenser 132 to the feed side of the OTR 170. Separated $H_2$ 134 from the condenser 132 is stored in the storage unit 136. Depending on the availability of $H_2O$ from the combustion process, part of the $CO_2$ gas 106 can be used in the solar reformation of methane during the day time. Excess $H_2O$ during the day time may be stored for use during the night time. A complete utilization of the exhaust gases is done through the power cycle so that the net gases emission is zero.

The presently described power cycle is an open cycle during the day time because of the $CH_4$ feed to the solar reformer; however, it's completely closed loop and self-energetic during the night time utilizing the syngas stored during the day time from the OTRs. The present power cycle is a Hybrid solar-syngas cycle utilizing the renewable free solar energy for syngas production during the day time.

In another embodiment of the invention, increasing the number of units of the OTR reactors can increase the power and syngas production. Preferably, there are two or more OTR reactors present in the system.

In the power cycle, there are two button cell reactors used in the present design for the production and combustion of syngas. The first button cell reactor is used in the separation of oxygen from $H_2O$ and producing $H_2$ in the feed side. The gases leaving the feed side of the reactor consist of both $H_2O$ and $H_2$. Heat exchange is made in order to evaporate the water stream and after that a condensation process is applied in order to separate $H_2O$. $H_2$ is collected in the feed side and stored in a tank for the use during night time. The syngas for the combustion process in the permeate side is extracted from the solar reformer at day time and during the night time, the stored syngas by the reactor is used. Full recirculation and reuse of the combustion gases ($H_2O$ and $CO_2$) is done by feeding these gases to the feed side of the OTR.

The second type of button cell reactor used in the present cycle is used for the separation of oxygen from $CO_2$ and producing CO in the feed side. The gases leaving the feed side of this reactor contain CO and $CO_2$. After exchanging heat with the $CO_2$ stream, a chemical separation process performed in order to separate CO from $CO_2$. The separated CO is stored in a storage tank for the night time use. During the night time, $H_2$ and CO are released from the storage units in an amount sufficient enough to produce a reaction in the oxygen transport reactor. Part of the separated $CO_2$ is then fed again to the feed side of the OTR and the other part is used during the day time in the reformation process of methane.

The present invention utilizes two OTRs. The first is a water vapor OTR and it is used to separate $H_2$ from water vapor in the feed side. The second OTR is a $CO_2$ OTR and it is used to separate CO from $CO_2$ in the feed side. For both of the OTRs, oxygen is separated from the feed side gas and permeates across the membrane to the permeate side for oxy-combustion process.

In one embodiment, a minimum amount of $O_2$ must be separated and passed through the membrane to the permeate side of the reactor in an amount sufficient to produce an oxy-combustion reaction.

The power cycle is carbon and $NO_x$ free cycle since the syngas is burnt with oxygen only (in absence of the nitrogen). Therefore, the exhaust gases contain only water vapor and carbon dioxide which can be easily separated and captured through cooling via a heat exchanger. The combustion products containing $H_2O$ and $CO_2$ are fed separately to the feed sides of the used OTRs in order to produce syngas ($H_2$ and CO, respectively) and provide oxygen for the combustion process.

In another embodiment of the invention, the oxygen transport reactor operates at a required operating temperature in which the required operating temperature is defined as the minimum temperature in which the system may produce a fuel combustion reaction when the feed gas is introduced into the oxygen transport reactor. During operation for oxygen separation, the reactor is heated preferably at a temperature above about 700° C. and more preferably from about 700° C. to about 1100° C.

The produced syngas in the feed side after its separation is used as fuel in the permeate side and the combustion gases in the permeate side are fed to the feed side after extracting the heat from them. The described power cycle is a closed loop cycle because of the complete utilization of the exhaust gases. The power cycle is very compact according to its produced power as it combines the processes of oxygen separation, syngas production and the fuel combustion in one reactor which is the OTR.

The power is generated by passing the combustion gases through a gas turbine. The cycle power can be increased according to the number of OTRs. In order to increase the cycle efficiency, the gases leaving the feed side of the water OTR consisting of $H_2O$ and $H_2$ are passed through a heat exchanger in order to evaporate the main liquid water stream before its feed to the reactor. The combustion gases contain $H_2O$ and $CO_2$ and after extracting their energy, the mixture is passed through a condenser in order to separate $H_2O$ to be fed to the OTR feed side after evaporation. The separated $CO_2$ from the flue gases is then compressed through a compressor powered by part of the gas turbine power to the OTR feed side after a heating process. The hot gases leaving the $CO_2$ OTR consist of CO and $CO_2$. These gases are used in heating the incoming $CO_2$ from the compressor before its feed to the feed side of the reactor. The gases leaving the feed side of the water vapor OTR consist of both $H_2O$ and $H_2$ and after passing through the heat exchanger, they are passed through a condenser in order to separate $H_2$. $H_2$ is collected in the feed side and stored in a tank for the use during night time. The gases leaving the feed side of the $CO_2$ OTR contain CO and $CO_2$. After exchanging heat with the $CO_2$ stream, a chemical separation process is performed to separate CO from $CO_2$. The separated CO is stored in a storage tank for the night time use. Part of the separated $CO_2$ in the chemical separator is fed again to the feed side of the $CO_2$ OTR and the other part is used during the day time in the dry reforming process of methane inside the solar reformer. During the day time, a solar reformer is used for methane reforming using $H_2O$ or $CO_2$ (part of combustion products) in order to produce syngas utilizing the solar energy. The minimum amount of solar energy and input gases into the solar reformer must be an amount sufficient enough to produce a sufficient amount of syngas to be input into the oxygen transport reactor to generate a fuel combustion reaction to power the system.

During the day time, the produced syngas from both of the OTR reactors is stored in storage tanks for the use during night beside the continuously produced syngas from the OTR reactors even at night. In the power cycle, the exhaust gases from the OTRs contain carbon dioxide and water vapor (oxy-combustion) which can be easily separated without the need of any chemical processing, thus, saving the energy required to separate carbon dioxide from the exhaust gases containing nitrogen in case of air combustion. The combustion products are used continuously as feed gases to the OTR reactors and part of them is used during the day time in the solar reformer. After separating $H_2O$ from the exhaust gases of the OTRs and during the day time, $H_2O$ is then evaporated using the heat from the syngas leaving the solar reformer in order to be fed to the OTR at the required operating temperature. This makes full use of the available energy in the syngas.

During the night time, the separated $H_2O$ from the exhaust gas is evaporated in a heat exchanger by recovering the heat from the leaving feed side gases of the OTR and then it is passed to the feed side of the OTR. Depending on the availability of $H_2O$ from the combustion process, part of the $CO_2$ can be used in the solar reformation of methane during the day time. Excess $H_2O$ during the day time can be stored for the use during the night time. The presently described power cycle is an open cycle during the day time because of the $CH_4$ feed to the solar reformer. The power cycle is closed loop and self-energetic during the night time utilizing the syngas stored during the day time from the OTRs. The power cycle is a Hybrid solar-syngas cycle utilizing the renewable free solar energy for syngas production during the day time. Thus, the cycle efficiency is improved due to the utilization of the free solar energy. The cycle needs very low input power cost as it is mostly dependent on the solar free energy during the day time and it depends during the night time on the stored (during day) and continuously produced syngas from the exhaust gases in the OTRs.

Thus, the foregoing discussion discloses and describes merely exemplary embodiments of the present invention. As will be understood by those skilled in the art, the present invention may be embodied in other specific forms without departing from the spirit or essential characteristics thereof Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claim is:

1. A zero-emission closed-loop hybrid solar-syngas power cycle system, comprising:
   a solar reformer that converts methane to a syngas comprising CO and $H_2$;
   a first oxygen transport reactor comprising a first ion transport membrane separating a first feed side and a first permeate side, the first feed side having a first feed inlet and a first feed outlet and the first permeate side having a first permeate inlet and a first permeate outlet,
   wherein $H_2O$ fed to the first feed inlet is converted into $H_2$ gas on the first feed side and oxygen that passes across the first ion transport membrane to the first permeate side; and a first gas mixture comprising $H_2$ and $H_2O$ is passed from the first feed outlet of the first oxygen transport reactor;

a second oxygen transport reactor comprising a second ion transport membrane separating a second feed side and a second permeate side, the second feed side having a second feed inlet and a second feed outlet and the second permeate side having a second permeate inlet and a second permeate outlet, wherein $CO_2$ gas fed to the second feed inlet is converted into CO gas on the second feed side and oxygen that passes across the second ion transport membrane to the second permeate side; and a second gas mixture comprising $CO_2$ and CO is passed from the second feed outlet of the second oxygen transport reactor;

a first condenser having a condenser inlet connected to the first feed outlet to separate the first gas mixture of $H_2$ and $H_2O$ into $H_2O$ and $H_2$ gas, a first condenser outlet connected to a $H_2$ storage unit to deliver the $H_2$ gas to the $H_2$ storage unit, and a second condenser outlet connected to the first feed inlet to recycle the $H_2O$ into the first feed side of the first oxygen transport reactor;

a CO separator having a separator inlet connected to the second feed outlet to separate the second gas mixture of $CO_2$ and CO into CO and $CO_2$, a first separator outlet connected to a CO storage unit to deliver the CO to the CO storage unit, and a second separator outlet connected to the second feed inlet to recycle the $CO_2$ into the second feed side of second oxygen transport reactor, wherein the $H_2$ storage unit and the CO storage unit are connected to the first permeate inlet and the second permeate inlet, wherein the first oxygen transport reactor and the second oxygen transport reactor combust the syngas from the solar reformer, a syngas formed of $H_2$ and CO from the $H_2$ storage unit and the CO storage unit, or both in the presence of oxygen in the first permeate and the second permeate side to form a first combustion gas mixture comprising water vapor and $CO_2$ gas;

a gas turbine connected to the first permeate outlet and the second permeate outlet to produce power from the first combustion gas mixture, wherein the gas turbine has a turbine outlet connected to a second condenser that separates the first combustion gas mixture into $H_2O$ and $CO_2$, wherein a first outlet of the second condenser is connected to the first feed inlet to feed the $H_2O$ to the first oxygen transport reactor and a second outlet of the second condenser is connected to the second feed inlet to feed the $CO_2$ to the second oxygen transport reactor.

2. The system of claim 1 further comprising:

a first $H_2O$ evaporator with a first evaporator inlet connected to the solar reformer to receive the syngas from the solar reformer and a first evaporator outlet connected to the first permeate inlet of the first oxygen transport reactor and the second permeate inlet of the second oxygen transport reactor to deliver the syngas to the first oxygen transport reactor and the second oxygen transport reactor, and a second evaporator inlet connected to the second condenser to receive the $H_2O$ from the second condenser and a second evaporator outlet connected to the solar reformer and the first feed inlet of the first oxygen transport reactor to deliver the $H_2O$ as an input gas during the day time.

3. The system of claim 2 further comprising:

a second $H_2O$ evaporator located in between the first feed outlet of the first oxygen transport reactor and the first condenser;

a compressor that receives the $CO_2$ from the second condenser; and wherein the second condenser separates the first combustion gas mixture into $H_2O$ and $CO_2$ and passes the $H_2O$ to the first $H_2O$ evaporator and/or the second $H_2O$ evaporator.

4. The system of claim 3 further comprising:

a $CO_2$ heat exchanger that receives the $CO_2$ from the compressor and the second gas mixture comprising CO and $CO_2$ from the second feed side of the second oxygen transport reactor;

wherein the $CO_2$ heat exchanger heats and passes the $CO_2$ to the second feed side of the second oxygen transport reactor.

5. The system of claim 4 wherein the CO separator has a third separator outlet connected to the solar reformer to pass the $CO_2$ to the solar reformer to be used as an input gas during the day time and wherein the CO gas is passed from the CO separator to the CO storage unit to be stored during the day time and to be released during the night time.

6. The system of claim 1 wherein:

the CO storage unit stores CO produced from the second feed side of the second oxygen transport reactor during the day time and releases CO during the night time;

the $H_2$ storage unit stores $H_2$ produced from the first feed side of the first oxygen transport reactor during the day time and releases $H_2$ gas during the night time; and wherein the CO gas from the CO storage unit is contacted with $H_2$ gas from the $H_2$ storage unit to form the syngas to be used as an input gas into the first permeate side of the first oxygen transport reactor and the second permeate side of the second oxygen transport reactor during the night time.

7. The system of claim 1 wherein: methane, solar energy, and at least one of $H_2O$ stream and $CO_2$ stream are input into the solar reformer to convert the methane to the syngas, and the syngas from the solar reformer is passed to the first permeate side of the first oxygen transport reactor and the second permeate side of the second oxygen transport reactor.

8. The system of claim 1 wherein oxygen is formed from $H_2O$ and/or $CO_2$ gas, $H_2$ and CO are produced to form the syngas, and the syngas is combusted inside the first permeate side of the first oxygen transport reactor and the second permeate side of the second oxygen transport reactor: and wherein a cycle power of the zero-emission closed-loop hybrid solar-syngas power cycle system is increased as the number of oxygen transport reactors are increased in the system.

9. The system of claim 1 in which the system does not produce $NO_x$ gas.

10. The system of claim 1 which is powered by combusting the syngas comprising CO and $H_2$ produced from the solar reformer and the syngas formed of $H_2$ and CO from the $H_2$ storage unit and the CO storage unit in the first oxygen transport reactor and the second oxygen transport reactor.

11. A method for producing syngas in the zero-emission closed-loop hybrid solar-syngas power cycle system of claim 1, the method comprising:

contacting methane and at least one of $H_2O$ and $CO_2$ in the solar reformer to produce syngas comprising CO and $H_2$;

converting $H_2O$ into $H_2$ gas on the first feed side of the first oxygen transport reactor and oxygen;

passing the oxygen across the first ion transport membrane to the first permeate side of the first oxygen transport reactor;

converting $CO_2$ gas into CO gas on the second feed side of the second oxygen transport reactor and oxygen;

passing the oxygen across the second ion transport membrane to the second permeate side of the second oxygen transport reactor;

passing the first gas mixture comprising $H_2$ and $H_2O$ from the first feed outlet of the first oxygen transport reactor and passing the second gas mixture comprising $CO_2$ and CO from the second feed outlet of the second oxygen transport reactor;

combusting the syngas on the first permeate side of the first oxygen transport reactor and the second permeate side of the second oxygen transport reactor to form the first combustion gas mixture comprising water vapor and $CO_2$ gas; and producing power from the first combustion gas mixture through the gas turbine.

12. The method of claim 11 wherein during the day time, the methane and the $H_2O$ are contacted in the solar reformer in the presence of solar energy to produce the syngas; and the method further comprises;

evaporating $H_2O$ through a first $H_2O$ evaporator to form H2O stream; and recycling the $H_2O$ stream into the solar reformer and/or into the first feed side of the first oxygen transport reactor.

13. The method of claim 11 wherein during the night the method further comprises:

contacting $H_2$ from the $H_2$ storage unit and CO from the CO storage unit to form the syngas comprising CO and $H_2$;

combusting the syngas from the $H_2$ storage unit and the CO storage unit in the first permeate side of the first oxygen transport reactor and the second permeate side of the second oxygen transport reactor; and releasing $H_2O$ stream from a second $H_2O$ evaporator into the first feed side of the first oxygen transport reactor.

* * * * *